US008736505B2

(12) United States Patent
Lambert et al.

(10) Patent No.: US 8,736,505 B2
(45) Date of Patent: May 27, 2014

(54) PHASED ARRAY ANTENNA

(75) Inventors: Jeremy R. Lambert, Westminster, CO (US); Richard D. Chapman, Arvada, CO (US); Michel W. Schnetzer, Westminster, CO (US); Paul Freeman, Broomfield, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 114 days.

(21) Appl. No.: 13/401,600

(22) Filed: Feb. 21, 2012

(65) Prior Publication Data

US 2013/0214980 A1    Aug. 22, 2013

(51) Int. Cl.
*H01Q 13/10*  (2006.01)

(52) U.S. Cl.
USPC ............................. 343/770; 343/767; 343/768

(58) Field of Classification Search
USPC ......................................... 343/767, 768, 770
See application file for complete search history.

(56) References Cited

U.S. PATENT DOCUMENTS

| | | | |
|---|---|---|---|
| 5,488,380 A | 1/1996 | Harvey et al. | |
| 5,519,408 A | 5/1996 | Schnetzer | |
| 5,949,382 A | 9/1999 | Quan | |
| 6,075,493 A | 6/2000 | Sugawara et al. | |
| 6,111,544 A | 8/2000 | Dakeya et al. | |
| 6,252,556 B1 | 6/2001 | Ito et al. | |
| 6,351,239 B1 | 2/2002 | Mizuno et al. | |
| 6,480,167 B2 | 11/2002 | Matthews | |
| 6,556,169 B1 | 4/2003 | Fukuura et al. | |
| 6,791,497 B2 | 9/2004 | Winebrand et al. | |
| 6,900,770 B2 | 5/2005 | Apostolos | |
| 7,057,570 B2* | 6/2006 | Irion et al. | 343/770 |
| 7,405,698 B2 | 7/2008 | de Rochemont | |
| 7,817,097 B2 | 10/2010 | Margomenos | |
| 2011/0057852 A1 | 3/2011 | Holland et al. | |

FOREIGN PATENT DOCUMENTS

WO    WO 00/64008    10/2000

OTHER PUBLICATIONS

Fisher "Design and Performance Analysis of a 1-40GHZ Ultra-Wideband Antipodal Vivaldi Antenna," German Radar Symposium GRS, 2000, 5 pages. (available at www.roke.co.uk/resources/papers/analysis-of-a-Ultra-wideband-Antipodal-Vivaldi-Antenna.pdf).
Stasiowski "Broadband Array Antenna," Cobham, available at www.cobham.com/media/83841/Broadband%20Array%20Antenna.pdf, Feb. 20, 2012, 18 pages.
Wang et al. "Design of a Compact Tapered Slot Vivaldi Antenna Array for See Through Concrete Wall UWB Applications," Proceedings of the Union of Radio Sceince, XXIX General Assembly, Aug. 7-16, 2008, Chicago, USA, 4 pages.
Weem et al. "Vivaldi Antenna Arrays for SKA," Antennas and Propagation Society International Symposium, 2000, 4 pages, (available at www.ecee.colorado.edu/microwave/docs/publications/2000/ABS_JPWbn_00.pdf).

(Continued)

*Primary Examiner* — Hoang V Nguyen
(74) *Attorney, Agent, or Firm* — Sheridan Ross P.C.

(57) ABSTRACT

A dual-polarized antenna array is disclosed. The antenna array includes a plurality of self supporting, electrically conductive members. Tapered elements of neighboring electrically conductive members define tapered slots that form part of radiating structures. The radiating structures additionally include a slot line in communication with the tapered slot. A back cavity can be included as part of a BALUN structure that is integral to an electrically conductive member.

21 Claims, 5 Drawing Sheets

(56) References Cited

OTHER PUBLICATIONS

Wu et al. "Investigation of Several Terahertz Electromagnetic Band Gap Structures," Microwave and Optical Technology Letters, vol. 52, No. 3, Dec. 2010, 9 pages.

Hojjat et al., "Design and Analysis of New Fermi-like Tapered Slot Antennas," IEEE Antennas and Propagation Society International Symposium, 2000, vol. 3, pp. 1616-1619.

Holter, "Element for wideband and very wide-angle phased arrays," IEEE Antennas and Propagation Society International Symposium, 2001, vol. 2, pp. 440-443.

International Search Report and Written Opinion for International (PCT) Patent Application No. PCT/US2013/026770 mailed May 3, 2013. 12 pages.

U.S. Appl. No. 13/564,501, filed Aug. 1, 2011, Freeman et al.

* cited by examiner

PHASED ARRAY ANTENNA

FIELD

A phased array antenna is provided. More particularly, a phased array antenna with an integrated BALUN is provided.

BACKGROUND

Tapered slot antennas, also known as Vivaldi antennas, have been developed for use in various applications. Usually, the width of the slot increases exponentially with distance from the feed point. In a typical implementation, the antenna is provided as orthogonal arrays of elements formed by conductive surfaces that define tapered slots therebetween. The conductive surfaces are usually formed on conventional printed circuit boards. More particularly, arrays of elements can be formed by using numerous printed circuit boards assembled in the form of a lattice array. Accordingly, such antenna arrays are sometimes referred to as "Vivaldi egg crate arrays". These antennas typically provide a bandwidth of about 3:1 or 4:1, although some designs provide a bandwidth of about 10:1.

Although such designs can be effective, they can also be complex and difficult to manufacture. For example, in a typical Vivaldi array, multiple rows of elements can be provided by arranging multiple parallel rows of substrates having plated elements formed thereon. In order to provide a dual-polarized antenna, additional elements can be formed on multiple parallel columns of substrates having plated elements formed thereon that are arranged perpendicular to the rows of substrates. The rows and/or columns are slotted where they intersect, to form a plurality of cruciform conductive structures. However, such assemblies are prone to defects. For example, proper operation of the arrays requires a good electrical connection between orthogonal plated elements of the individual cruciform conductive structures, which is difficult to achieve. Moreover, the multiple boards are difficult to align and assemble.

In addition, the conventional balanced-to-unbalanced (BALUN) transition design for a Vivaldi antenna uses printed circuit board processes. Such BALUNs often include separate feed lines that extend across the tapered slot and that are terminated at a tapered element. BALUNs have also been proposed that incorporate radio frequency absorbing materials. However, most previous BALUN designs have been inefficient and difficult to manufacture.

Therefore, it would be desirable to provide a relatively reliable and robust phased array antenna. It would also be desirable to provide such an antenna that was efficient and that was relatively easy to manufacture.

SUMMARY

Embodiments of the disclosed invention are directed to solving these and other problems and disadvantages of the prior art. In particular, systems and methods for providing an antenna with a plurality of integral, electrically conductive members are disclosed. In general, each electrically conductive member includes one or more tapered elements. Each of the tapered elements can cooperate with a neighboring tapered element to form a tapered slot therebetween. In addition, systems and methods for providing an integrated balanced-to-unbalanced transition (BALUN) are disclosed. In accordance with at least some embodiments of the present disclosure, an antenna comprising an array of elements that is suitable for use in connection with a wide band, dual-polarized, phased array system is provided.

Antenna systems in accordance with embodiments of the disclosed invention include tapered slots. The tapered slots are defined between complimentary tapered fins or elements. Moreover, the tapered fins or elements can be formed as part of self supporting electrically conductive elements, and can be interconnected to and/or integral with a ground plane. The antenna system can include a plurality of tapered slots, each being defined between a complimentary pair of tapered elements within a first plane. The tapered elements within each pair can be separated from one another by the ambient environment, which can include but is not limited to air. Dual-polarized operation can be supported by providing complimentary pairs of tapered elements that define tapered slots within a second plane that is perpendicular to the first plane. Moreover, an array in accordance with embodiments of the disclosed invention can include a plurality of rows and a plurality of columns of tapered slots, where the rows of complimentary tapered elements forming the rows of tapered slots are parallel to the first plane, and the columns of tapered elements forming the columns of tapered slots are parallel to the second plane.

Embodiments of the disclosed invention can additionally incorporate an integrated BALUN transition structure. The BALUN can include a feed arm that is separated from a slot line edge of a tapered element of a first electrically conductive member by a slot line. The feed arm can be integral to a tapered element of a second electrically conductive member, where the two tapered elements are complimentary to one another and define a tapered slot therebetween. Moreover, the slot line is contiguous with the tapered feed defined between the two complimentary tapered elements. In accordance with further embodiments, the BALUN includes a back cavity that is formed on a side of the feed arm opposite the slot line, between the feed arm, a base portion or edge of the second electrically conductive member, and the ground plane.

The electrically conductive members can be self supporting, and complimentary tapered elements of adjacent electrically conductive feed members can be separated from one another by free space. In addition, the electrically conductive members can extend from a ground plane or conductive substrate, to which the electrically conductive members are electrically connected. The electrically conductive members can also be mechanically fixed and/or integral to, and can extend from, the ground plane. At least some of the electrically conductive members can be generally cruciform in plan view. In addition, the electrically conductive members can include isolation walls that are located between orthogonal tapered elements of an electrically conductive member.

In accordance with embodiments of the disclosed invention, an antenna array includes a plurality of self supporting electrically conductive members. The self supporting electrically conductive members can be formed using an additive process, in which the electrically conductive members are "grown" from the surface of a substrate. For example, the self supporting electrically conductive members can be formed using selective laser sintering (SLS), followed by plating with an electrically conductive material. As a further example, the self supporting members can be formed using direct metal laser sintering (DMLS) techniques, or similar processes. Accordingly, an array comprising a plurality of electrically conductive members can be formed as an integrated unit. Moreover, the number of individual components used in forming an operative antenna array can be reduced as compared to prior designs of Vivaldi type arrays. For example, the ground plane, BALUN, and tapered feed of multiple electrically conductive members, arranged in multiple rows and columns, can be formed as a single, integrated unit.

Additional features and advantages of embodiments of the disclosed invention will become more readily apparent from the following description, particularly when taken together with the accompanying drawings.

DETAILED DESCRIPTION

Figure 1:
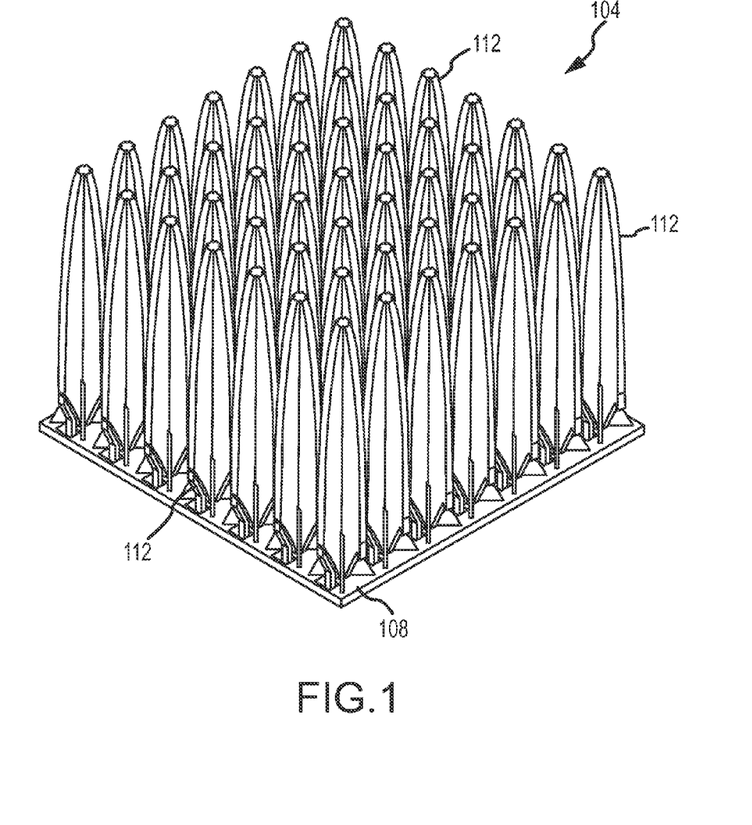
FIG. 1 is a perspective view of an antenna array in accordance with embodiments of the present disclosure.

FIG. 1 depicts an antenna array 104 in accordance with embodiments of the present disclosure. The antenna array 104 generally includes a substrate or a ground plane 108 and a plurality of electrically conductive members 112. In general, the electrically conductive members 112 are self supporting, and are at a non-zero angle with respect to a plane of the substrate or ground plane 108. Each of the electrically conductive members 112 cooperates with one or more adjacent electrically conductive members 112 to define one or more tapered slots, as will be described in greater detail elsewhere herein. In accordance with embodiments of the present disclosure, each of the electrically conductive members 112 is electrically interconnected to any of the other electrically conductive members 112 via at least the ground plane 108.

Figure 2:
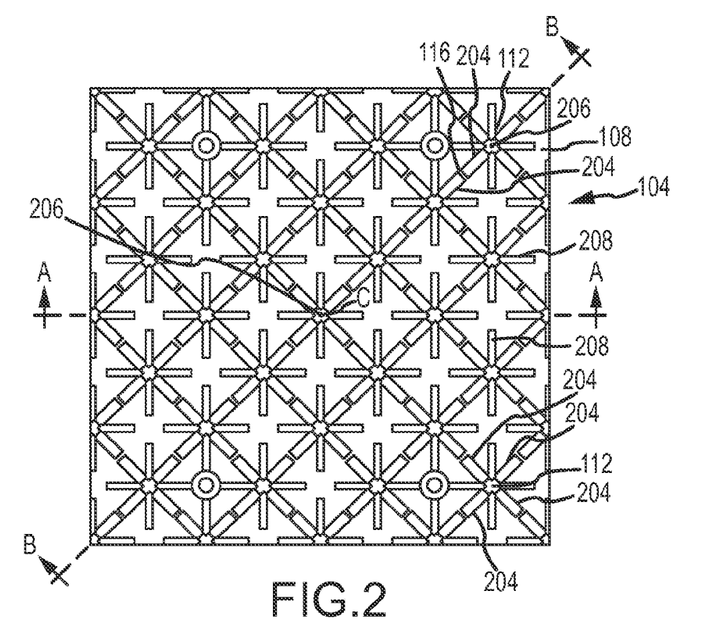
FIG. 2 is a top plan view of the antenna array of FIG. 1.

FIG. 2 depicts the antenna array 104 of FIG. 1 in a top plan view. As seen in this figure, each electrically conductive member 112 includes one or more tapered feed elements or fins 204. Each electrically conductive member 112 includes between one and four tapered elements 204. In addition, each tapered element 204 of any one electrically conductive member 112 can be parallel to or lie within a plane that is at an angle of 90° or 180° with respect to any other tapered elements 204 included in that electrically conductive member 112. The tapered element or elements 204 of each electrically conductive member 112 can cooperate with between one and four other electrically conductive members 112 to form tapered slots 116 therebetween. These tapered slots 116 generally comprise a gap between adjacent tapered elements 204 within a common plane and belonging to neighboring electrically conductive members 112.

The electrically conductive members 112 may be regularly spaced across the surface of the ground plane 108. More particularly, the electrically conductive members 112 can be disposed such that at least most of the electrically conductive members 112 have a center axis 206 that is located at the intersection of two perpendicular lines generally parallel to the tapered elements 204. As shown, these perpendicular lines may be at non-zero angles with respect to the edges of the ground plane 108. Alternatively, the lines along which the electrically conductive members 112 are arranged can be at any angle with respect to the edges of the ground plane 108, including but not limited to parallel to those edges. Accordingly, the electrically conductive members 112 are disposed as an array. Point C indicates the center point of the example array of electrically conductive members 112, and is provided as a common reference point between FIGS. 2-4.

As also shown in FIG. 2, each electrically conductive member 112 can include one or more isolation walls 208. As described in greater detail elsewhere herein, each isolation wall 208 extends from the surface of the ground plane 108 to a point proximate to a base of the associated electrically conductive member 112. Moreover, for electrically conductive members 112 having a plurality of tapered elements 204, an isolation wall 208 may be disposed between at least portions of adjacent tapered elements 204.

Figure 3:
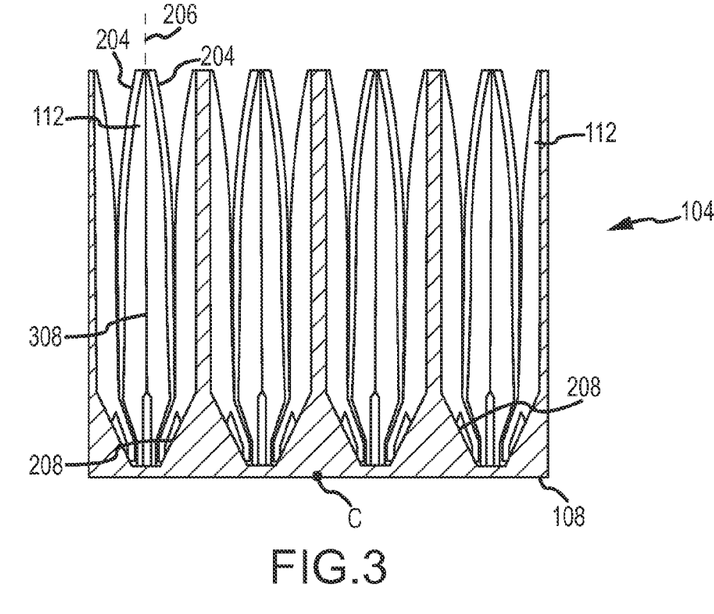
FIG. 3 is a side view in elevation of the antenna array of FIGS. 1 and 2 taken along section line A-A in FIG. 2.

FIG. 3 illustrates the exemplary antenna array 104 of FIGS. 1 and 2 in a side elevation view taken along section line A-A in FIG. 2. Each of the electrically conductive members 112 are self supporting. In addition, the spaces between adjacent tapered elements 204 comprises a gap. This gap can be occupied by the ambient environment. As an example and without limitation, the gaps between adjacent electrically conductive members 112 can be occupied by air. In addition, the isolation walls 208 can be seen to extend for only a portion of the height of associated electrically conductive members 112. The center axis 206 of an electrically conductive member 112 is shown as a dotted line. The orthogonal tapered elements 204 of each electrically conductive member 112 having at least two adjacent tapered elements 204 are mechanically and electrically joined to one another along a line 308 that is parallel to the center axis 206 of the electrically conductive member 112.

Figure 4:
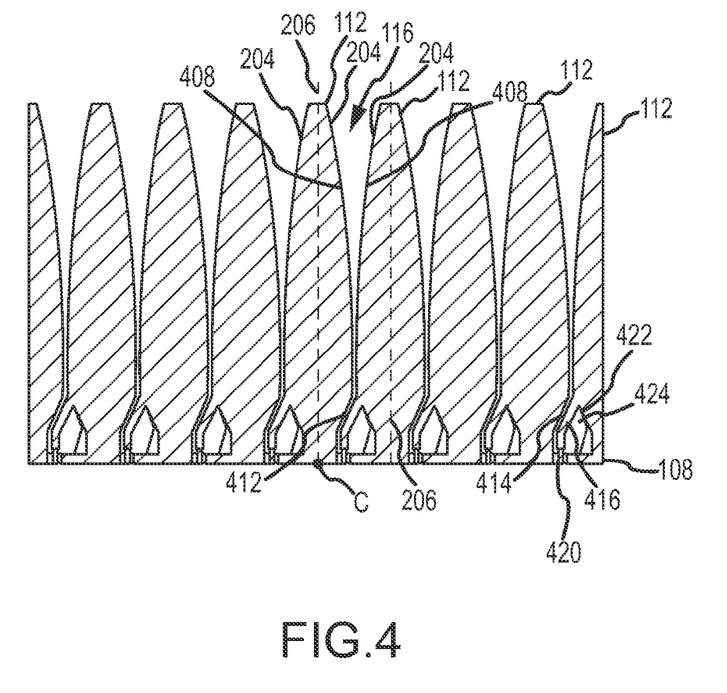
FIG. 4 is a cross-section in elevation of the antenna array of FIGS. 1-3, taken along section line B-B of FIG. 2.

FIG. 4 illustrates the exemplary antenna array 104 of FIGS. 1-3 in a side elevation view taken along section line B-B in FIG. 2. Accordingly, the view in FIG. 4 is shifted 45° with respect to the view shown in FIG. 3. Moreover, the view in FIG. 4 is along a line that passes through the center axis 206 of each electrically conductive member 112 in a row (or alternatively a column) of electrically conductive members 112. In this view, the electrically conductive members 112 at the opposing edges of the antenna array 104 have a single tapered element 204 in the plane of the row of electrically conductive members 112, while the interior electrically conductive members 112 can be seen to each have a pair of tapered elements 204 in that plane that is symmetrical about the center axis 206. In addition, pairs of tapered elements 204 of neighbors of electrically conductive members 112 define tapered slots 116 therebetween. In general, the tapered slots 116 extend along a distance of adjacent electrically conductive members 112 corresponding to a tapered edge or feed portion 408 of adjacent, co-planar tapered elements 204. The tapered slots 116 are each associated with a slot line 412 at an end of the tapered slot 116 nearest the ground plane 108. Each slot line 412 generally comprises a gap between a first slot line portion or edge 414 of a tapered element 204 of a first electrically conductive member 112, and a first feed arm 416 of a second electrically conductive member 112. The feed arm 416 can be interconnected to a feed line 420 proximate to the ground plane 108. The feed arm 416 is electrically interconnected and integral to the second electrically conductive member 112. An edge of the feed arm 416 opposite the slot line 412, together with the ground plane 108, and a base portion or edge 422 of the electrically conductive member 112 of which the feed arm 416 is an integral part, define at least portions of a back cavity 424. Accordingly, the back cavity 424 may comprise a void generally behind the tapered slot 116. Moreover, one tapered element 204 within each complimentary pair of tapered elements 204 is electrically interconnected to a feed arm 416 and feed line 420. As a result, an electrically conductive member 112 can have as many as two feed arms 416, with each feed arm 416 being interconnected to a feed line 420. In addition, for an electrically conductive member 112 with two feed arms 416, these feed arms 416 lie in orthogonal planes. As can be appreciated by one of skill in the art after consideration of the present disclosure, orthogonal feed arms 416 that each are associated with a feed line 420 support the reception and/or transmission of dual-polarized signals.

Figure 5:
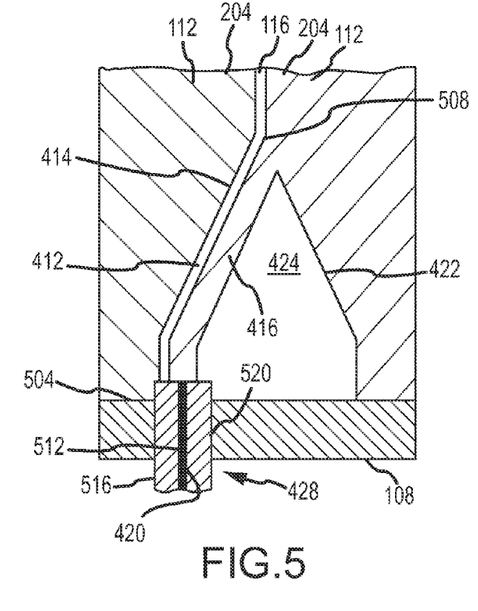
FIG. 5 is a cross-section in elevation of a back cavity and a slot line in accordance with embodiments of the present disclosure, taken along section line B-B of FIG. 2.

With reference now to FIG. 5, a back cavity 424 and portions of surrounding structures in accordance with embodiments of the present disclosure are illustrated in cross-section taken along section line B-B of FIG. 2. As shown, the slot line 412 can have a constant gap or width over its entire length, between the top surface 504 of the ground plane 108 and a top 508 of the feed arm 416, where the slot line 412 joins the tapered slot 116. The feed line 420 can, in at least some embodiments, include a coaxial cable 428, with a center conductor 512 that is electrically interconnected to the feed arm 416, and a shield or ground conductor 516 that is electrically interconnected to the ground plane 108. The center conductor 512 can pass through a hole or aperture 520 formed in the ground plane 108. The ground conductor 516 of the feed line 420 can be electrically connected to the ground plane 108 at a location proximate to or surrounding the hole 520.

Figure 6:
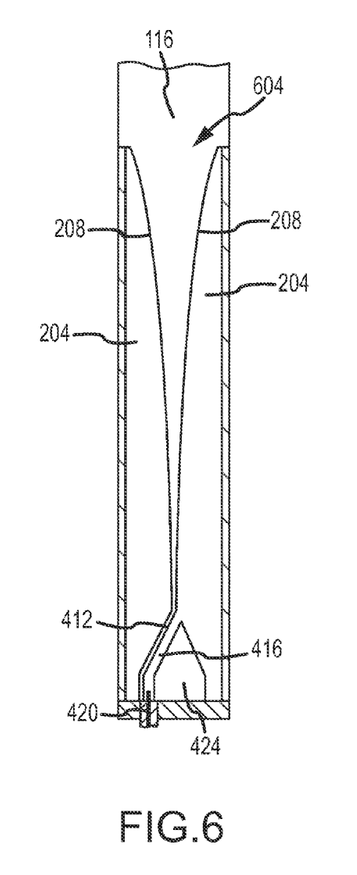
FIG. 6 is a cross-section in elevation of a radiating structure defined between complimentary tapered elements in accordance with embodiments of the present disclosure, taken along a plane parallel to but spaced apart from section line B-B of FIG. 2.

FIG. 6 is a cross-section in elevation of a radiating structure 604 defined between complimentary tapered elements 204 of adjacent electrically conductive members 112 in accordance with embodiments of the present disclosure taken along a plane parallel to but spaced apart from section line B-B of FIG. 2. More particularly, the radiating structure 604 includes the slot line 412 and the tapered slot 116 that is fed by the slot line 412. In operation, radio frequency energy, in a transmitting mode, is provided to the radiating structure by introducing that signal to the feed arm 416 via the feed line 420. As can be appreciated by one of skill in the art after consideration of the present disclosure, electromagnetic waves will travel along the slot line 412 to the tapered slot 116. The tapered slot 116 launches the electromagnetic waves into the surrounding environment. The bandwidths at which the radiating structure can effectively operate are defined by the different distances between the cooperating tapered elements 204 (i.e., by the width of the tapered slot 116).

As will also be apparent to one of skill in the art after consideration of the present disclosure, it is desirable to provide a BALUN to facilitate the efficient transmission of the electromagnetic energy. In accordance with embodiments of the present disclosure, a BALUN is provided that comprises the feed line 420 and the slot line 412 transmission line section that directly feeds the tapered slot 116, together with the back cavity 424. More particularly, the radio frequency energy from the feed line 420 is coupled directly into the BALUN structure via a direct transition from the feed line (e.g., coaxial) mode to a slot line mode. The electromagnetic energy then undergoes a gradual impedance transition along the tapered slot 116, and radiates from the tapered slot 116 into free space. The BALUN is unique in that it is entirely implemented inside the back cavity 424 short. The BALUN disclosed herein is effectively a continuation of the tapered feed portion 116, because it uses a slot line load that readily couples to the feed coaxial mode with minimal discontinuity and radiation. As a result, radiation and loss can be reduced as compared to conventional BALUN designs.

Figure 7:
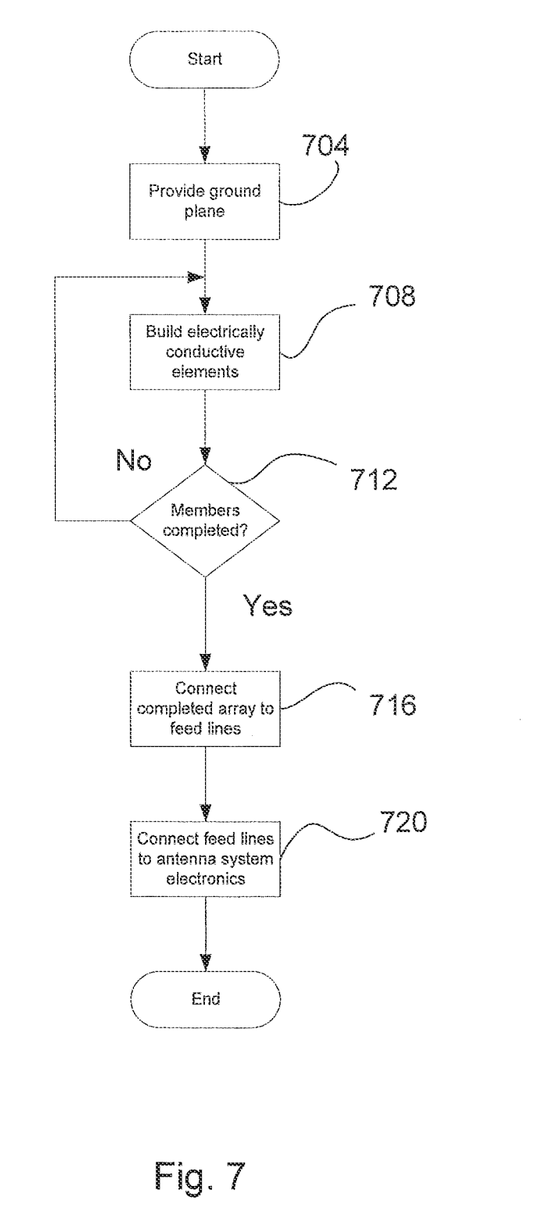
FIG. 7 is a flowchart illustrating aspects of a method for forming an antenna in accordance with embodiments of the present disclosure.

FIG. 7 is a flowchart illustrating aspects of a method for forming an antenna 104 in accordance with embodiments of the present disclosure. Initially, at step 704, a ground plane is provided. The ground plane 108 can comprise an electrically conductive substrate. At step 708, an additive process is used to build the electrically conductive members 112 of the antenna array 104. More particularly, the electrically conductive members 112 can be built up gradually starting from the ground plane 108, such that the electrically conductive members 112 are interconnected to and extend from the ground plane 108. As examples, and without limitation, the additive process used to form the electrically conductive members 112 can comprise direct metal laser sintering (DMLS) techniques. Alternatively, the electrically conductive members 112 can be formed from a selective laser sintering (SLS) process, followed by plating with an electrically conductive material. At step 712, a determination can be made as to whether the electrically conductive members 112 have been completed. If the electrically conductive members 112 have not been completed, the process can return to step 708, and the additive process can continue. Once the process is completed, an antenna array 104 with integral, self supporting electrically conductive members 112 will have been formed. Moreover, because the electrically conductive members 112 have been grown from the surface of the substrate 108, they are interconnected to and/or are integral to the ground plane 108 and to the other electrically conductive members 112 in the antenna array 104. Where the electrically conductive members 112 have been formed from a non-conductive material, for example using an SLS process, the surfaces of each of the electrically conductive members 112 can be plated with an electrically conductive material. Alternatively, where the electrically conductive members 112 have been formed from an electrically conductive material, the step of plating can be omitted.

After the antenna array 104 has been completed, connections between electrically conductive members 112 of the array 104 and feed lines 420 can be completed (step 716). Where the antenna array 104 includes perpendicular rows of complimentary tapered elements 204, at least some of the electrically conductive members 112 can be interconnected to two separate feed lines 420, such that orthogonal tapered elements 204 can transmit and/or receive signals having different polarizations. Moreover, the interconnection of the antenna array 104 to feed lines 420 can comprise passing the center conductor 512 of the feed line 420 through a hole or aperture formed in the ground plane 108, and electrically interconnecting the center conductor 512 to a feed arm 416. The shield or ground conductor 516 can be interconnected to the ground plane 108 at a location proximate to the aperture. At step 716, the feed lines 420 can be interconnected to antenna system electronics, such as a transceiver, amplifier, and the like. The process can then end.

In operation, an antenna array 104 in accordance with embodiments of the disclosed invention can be used to transmit and/or receive signals over a range of bandwidth. Moreover, dual-polarized operation can be exported. In addition, an antenna array 104 in accordance with embodiments of the present disclosure can be operated as a phased array antenna.

Although various examples provided herein have included tapered slots 116 that each have a width that increases exponentially with distance from the associated slot line 412, other configurations are possible. For example, the width of the tapered slots 116 can increase linearly.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An antenna, comprising:
a first electrically conductive member, including:
   a first tapered element, including:
      a tapered feed portion; and
      a first slot line portion;
a second electrically conductive member, including:
   a first tapered element, including:
      a tapered feed portion, wherein the tapered feed portion of the first tapered element of the first electrically conductive member and the tapered feed portion of the first tapered element of the second electrically conductive member form a tapered slot; and
      a first feed arm, wherein the first feed arm is separated from the first slot line portion of the first tapered element of the first electrically conductive member by a slot line, wherein the first feed arm is electrically connected to the first tapered element of the second electrically conductive member, and wherein the slot line is contiguous with the tapered slot.

2. The antenna of claim 1, further comprising:
a ground plane;
a first back cavity, wherein the first back cavity is bounded by at least the ground plane, the first feed arm, and a base portion of the second electrically conductive member.

3. The antenna of claim 2, wherein the second electrically conductive member further includes a second tapered element, wherein the first and second tapered elements of the second electrically conductive member lie within a first plane.

4. The antenna of claim 3, wherein the second electrically conductive member further includes:
a first orthogonal tapered element, wherein the first orthogonal tapered element lies in a second plane that is orthogonal to the first plane, and wherein the first orthogonal tapered element is joined to at least the first tapered element along a line that is parallel to a center axis of the second electrically conductive member.

5. The antenna of claim 4, wherein the second electrically conductive member further includes:
a second orthogonal tapered element, wherein the second orthogonal tapered element is orthogonal to the first and second tapered elements, wherein the second orthogonal tapered element lies in the second plane, and wherein the second orthogonal tapered element is joined to the second tapered element along a line that is parallel to the center axis of the second electrically conductive member.

6. The antenna of claim 5, further comprising:
a third electrically conductive member, including:
a first tapered element that lies in a third plane that is parallel to the first plane;
a first orthogonal tapered element that lies in the second plane, wherein the first tapered element of the third electrically conductive member and the first orthogonal tapered element of the third electrically conductive member are joined along a line that is parallel to at least a center axis of the third electrically conductive member.

7. The antenna of claim 6, wherein the center axis of the second electrically conductive member is perpendicular to at least a portion of the ground plane, and wherein the center axis of the second electrically conductive member is parallel to the center axis of the third electrically conductive member.

8. The antenna of claim 4, wherein the first and second electrically conductive members are self supporting.

9. The antenna of claim 8, wherein the second electrically conductive member further includes:
a first set of isolation walls, wherein each isolation wall in the first set of isolation walls extends from the ground plane to a junction between the first tapered feed portion and the first orthogonal tapered element.

10. The antenna of claim 9, wherein each isolation wall in the first set of isolation walls does not lie in either of the first or second planes.

11. The antenna of claim 4, further comprising:
a feed line, wherein the feed line includes a signal line, wherein the signal line is electrically connected to the first feed arm, wherein the feed line further includes a ground line, and wherein the ground line is electrically connected to the ground plane.

12. An antenna system, comprising:
a ground plane element;
a first plurality of antenna elements interconnected to the ground plane element, wherein each antenna element in the first plurality of antenna elements includes:
   a first tapered portion, wherein the first tapered portion is symmetrical about an antenna element axis in a first plane;
   a first feed arm, wherein the first feed arm extends from the ground plane to the first tapered portion, and wherein the first feed arm at least partially defines a first back cavity;
   a second tapered portion, wherein the second tapered portion is joined to the first tapered portion along at least the antenna element axis, wherein the second tapered portion is symmetrical about the antenna element axis in a second plane, and wherein the first plane is perpendicular to the second plane.

13. The system of claim 12, wherein each antenna element in the first plurality of antenna elements further includes:
a second feed arm, wherein the first feed arm extends from the ground plane to the second tapered portion, and wherein the second feed arm at least partially defines a second back cavity.

14. The system of claim 13, wherein the first feed arm further defines a portion of a slot line on a side of the first feed arm opposite the first back cavity.

15. The system of claim 14, wherein each antenna element in the first plurality of antenna elements further includes a slot line edge, wherein a first feed arm of a first antenna element included in the first plurality of antenna elements cooperates with a slot line edge of a second antenna element to define a slot line.

16. The system of claim 15, wherein at least a portion of the first tapered portion of the first antenna element and at least a portion of the first tapered portion of the second antenna element form a tapered slot.

17. The system of claim 16, wherein the tapered slot is occupied by free space.

18. The system of claim 16, wherein each antenna element in the first plurality of antenna elements further includes a plurality of isolation walls, wherein one isolation wall is located between adjacent portions of the first and second tapered portions of at least the first antenna element.

19. The system of claim 12, further comprising:
a second plurality of antenna elements interconnected to the ground plane element, wherein each antenna element in the second plurality of antenna elements includes:
a first tapered portion, wherein the first tapered portion extends to one side of an antenna element axis in the first plane;
a second tapered portion, wherein the second tapered portion is joined to the first tapered portion along at least the antenna element axis, wherein the second tapered element extends to at least one side of the antenna element axis in the second plane, and wherein the first plane is perpendicular to the second plane.

20. A method for providing a dual-polarized array antenna, comprising:
providing a substrate element, wherein at least a first surface of the substrate element lies in a first plane;
forming a plurality of antenna elements using an additive process, wherein each antenna element in the plurality of antenna elements extends from the substrate element, and wherein at least a tapered element portion of each antenna element in the plurality of antenna elements cooperates with at least a portion of an adjacent antenna element to form a tapered slot, wherein at least most of the plurality of antenna elements include a feed arm that is co-planer with a tapered element and that ia separated from a slot line portion of the antenna element by a slot line, wherein the slot line is contiguous with the tapered slot, and wherein each antenna element is self-supporting and is separated from an adjacent antenna element by free space.

21. The method of claim 20, wherein the antenna elements are formed using a selective laser sintering process, the method further comprising:
plating the antenna elements with a metal.

* * * * *

UNITED STATES PATENT AND TRADEMARK OFFICE
CERTIFICATE OF CORRECTION

| | | |
|---|---|---|
| PATENT NO. | : 8,736,505 B2 | Page 1 of 1 |
| APPLICATION NO. | : 13/401600 | |
| DATED | : May 27, 2014 | |
| INVENTOR(S) | : Lambert et al. | |

It is certified that error appears in the above-identified patent and that said Letters Patent is hereby corrected as shown below:

In the Claims:

In column 8, claim 9, line 21, delete "first tapered feed portion" and insert -- first tapered element --

In column 10, claim 20, line 13, delete "ia" and insert -- is --

Signed and Sealed this
Seventh Day of October, 2014

Michelle K. Lee
*Deputy Director of the United States Patent and Trademark Office*